(12) United States Patent
Solari

(10) Patent No.: US 11,531,670 B2
(45) Date of Patent: Dec. 20, 2022

(54) METHODS AND SYSTEMS FOR CAPTURING DATA OF A DATABASE RECORD RELATED TO AN EVENT

(71) Applicant: Ensemble RCM, LLC, Cincinnati, OH (US)

(72) Inventor: Soren Solari, Big Sky, MT (US)

(73) Assignee: Ensemble RCM, LLC, Cincinnati, OH (US)

( * ) Notice: Subject to any disclaimer, the term of this patent is extended or adjusted under 35 U.S.C. 154(b) by 178 days.

(21) Appl. No.: 17/021,735

(22) Filed: Sep. 15, 2020

(65) Prior Publication Data
US 2022/0083532 A1     Mar. 17, 2022

(51) Int. Cl.
| | | |
|---|---|---|
| G06F 7/00 | (2006.01) | |
| G06F 16/23 | (2019.01) | |
| G06N 5/04 | (2006.01) | |
| G06N 20/00 | (2019.01) | |

(52) U.S. Cl.
CPC ........... *G06F 16/2365* (2019.01); *G06N 5/04* (2013.01); *G06N 20/00* (2019.01)

(58) Field of Classification Search
CPC ........... G06F 16/2365; G06F 16/24554; G06F 16/2425; G06N 20/00; G06N 20/10; G06N 5/04; G06N 5/027
See application file for complete search history.

(56) References Cited

U.S. PATENT DOCUMENTS

| | | |
|---|---|---|
| 5,991,733 A | 11/1999 | Aleia et al. |
| 6,012,035 A | 1/2000 | Freeman, Jr. et al. |
| 6,144,375 A | 11/2000 | Jain et al. |
| 6,216,109 B1 | 4/2001 | Zweben et al. |
| 6,256,667 B1 | 7/2001 | Wanghlander et al. |
| 6,463,346 B1 | 10/2002 | Flockhart et al. |

(Continued)

FOREIGN PATENT DOCUMENTS

| | | |
|---|---|---|
| WO | WO 2016/077127 | 5/2016 |
| WO | WO 2017/070126 | 4/2017 |
| WO | WO 2018/107128 | 6/2018 |

OTHER PUBLICATIONS

Prado Lima et al., "A Multi-Armed Bandit Approach for Test Case Prioritization in Continuous Integration Environments," IEEE Transactions on Software Engineering, 2020, 12 pages.

(Continued)

*Primary Examiner* — Mohammad A Sana
(74) *Attorney, Agent, or Firm* — Sheridan Ross P.C.

(57) ABSTRACT

Embodiments are directed to methods and systems for capturing data of a database record related to an event. Each record can comprise a record of a service provided to a consumer by a service provider of a plurality of service providers and a records management and processing system can comprise an intermediary between systems of the plurality of service providers and systems of a plurality of responsible entities. The records management and processing system can predict possible missing data in one or more records of the plurality of records in the database, select at least one record of the one or more records of the plurality of records predicted to have possible missing data, and initiate, for each selected record, a workflow for further processing of each selected record. The further processing can be directed to collecting the missing data.

14 Claims, 6 Drawing Sheets

(56) References Cited

U.S. PATENT DOCUMENTS

| | | | |
|---|---|---|---|
| 6,820,266 | B1 | 11/2004 | Minakawa et al. |
| 7,260,553 | B2 | 8/2007 | Ebert |
| 7,667,604 | B2 | 2/2010 | Ebert et al. |
| 8,880,591 | B2 | 11/2014 | Feldman et al. |
| 8,924,269 | B1 | 12/2014 | Seubert et al. |
| 9,218,387 | B2 | 12/2015 | Fennell et al. |
| 9,262,493 | B1 | 2/2016 | Dietrich |
| 10,324,783 | B1 | 6/2019 | Saha et al. |
| 10,402,909 | B1 | 9/2019 | Khalak et al. |
| 10,528,545 | B1 | 1/2020 | Girulat, Jr. |
| 10,628,553 | B1 | 4/2020 | Murrish et al. |
| 10,860,585 | B2 | 11/2020 | Schouten et al. |
| 10,929,128 | B2 | 2/2021 | Miller |
| 10,977,239 | B2 | 4/2021 | Schouten et al. |
| 10,977,243 | B2 | 4/2021 | Schouten et al. |
| 11,182,833 | B2* | 11/2021 | Asthana .............. G06Q 30/0206 |
| 11,216,701 | B1* | 1/2022 | Sim ...................... G06V 10/778 |
| 2003/0191669 | A1 | 10/2003 | Fitzgerald et al. |
| 2003/0233341 | A1 | 12/2003 | Taylor et al. |
| 2005/0154710 | A1 | 7/2005 | Ruhlow et al. |
| 2006/0031094 | A1* | 2/2006 | Cohen .................... G16H 20/30 705/2 |
| 2006/0271412 | A1 | 11/2006 | Sohr et al. |
| 2007/0038946 | A1 | 2/2007 | Grieshaber et al. |
| 2007/0087756 | A1 | 4/2007 | Hoffberg |
| 2007/0143610 | A1 | 6/2007 | Machiraju et al. |
| 2007/0162308 | A1 | 7/2007 | Peters |
| 2008/0028363 | A1 | 1/2008 | Mathew |
| 2008/0120205 | A1 | 5/2008 | Hoopes et al. |
| 2008/0222640 | A1 | 9/2008 | Daly et al. |
| 2009/0089078 | A1 | 4/2009 | Bursey |
| 2009/0106642 | A1 | 4/2009 | Albornoz et al. |
| 2009/0260021 | A1 | 10/2009 | Haenel et al. |
| 2009/0276243 | A1 | 11/2009 | Fotsch et al. |
| 2010/0185973 | A1 | 7/2010 | Ali et al. |
| 2012/0011041 | A1 | 1/2012 | Beydler et al. |
| 2012/0078678 | A1 | 3/2012 | Pradhan et al. |
| 2012/0131541 | A1 | 5/2012 | Anetseder |
| 2012/0151486 | A1 | 6/2012 | Owen et al. |
| 2012/0185275 | A1 | 7/2012 | Loghmani |
| 2012/0215772 | A1 | 8/2012 | Eshwar et al. |
| 2013/0041692 | A1 | 2/2013 | Hasan et al. |
| 2013/0093759 | A1 | 4/2013 | Bailey |
| 2013/0204145 | A1 | 8/2013 | Shah |
| 2013/0318135 | A1 | 11/2013 | Nourani |
| 2014/0006441 | A1 | 1/2014 | Torman et al. |
| 2014/0136237 | A1 | 5/2014 | Anderson et al. |
| 2014/0189576 | A1 | 7/2014 | Carmi |
| 2014/0222684 | A1 | 8/2014 | Felsher |
| 2014/0278627 | A1 | 9/2014 | Grabovski |
| 2014/0279329 | A1 | 9/2014 | Dancel |
| 2014/0365241 | A1 | 12/2014 | Dillie et al. |
| 2015/0020213 | A1 | 1/2015 | Decouteau et al. |
| 2015/0088907 | A1* | 3/2015 | Li ......................... G16H 10/60 707/749 |
| 2015/0269209 | A1 | 9/2015 | Kemp |
| 2015/0278699 | A1 | 10/2015 | Danielsson |
| 2015/0310362 | A1 | 10/2015 | Huffman |
| 2016/0042135 | A1 | 2/2016 | Hogan et al. |
| 2016/0048780 | A1 | 2/2016 | Sethumadhavan et al. |
| 2016/0085926 | A1 | 3/2016 | Ivanoff et al. |
| 2016/0132787 | A1 | 5/2016 | Drevo et al. |
| 2016/0196131 | A1 | 7/2016 | Searle et al. |
| 2016/0253463 | A1 | 9/2016 | Shu et al. |
| 2016/0283876 | A1 | 9/2016 | Ramaswamy et al. |
| 2017/0053014 | A1 | 2/2017 | Lavallee |
| 2017/0053104 | A1 | 2/2017 | Koch et al. |
| 2017/0243228 | A1 | 8/2017 | Wang et al. |
| 2017/0371876 | A1 | 12/2017 | Bailey |
| 2018/0197145 | A1 | 7/2018 | LaRowe et al. |
| 2018/0260914 | A1 | 9/2018 | Kemp |
| 2018/0301222 | A1 | 10/2018 | Dew et al. |
| 2018/0350006 | A1 | 12/2018 | Agrawal et al. |
| 2019/0102392 | A1 | 4/2019 | Tseretopoulos et al. |
| 2019/0103174 | A1 | 4/2019 | Power et al. |
| 2019/0154856 | A1 | 5/2019 | Valero et al. |
| 2019/0179924 | A1 | 6/2019 | Schouten et al. |
| 2019/0179945 | A1 | 6/2019 | Schouten et al. |
| 2019/0244110 | A1 | 8/2019 | Qiu et al. |
| 2020/0012730 | A1 | 1/2020 | Schouten et al. |
| 2020/0134060 | A1 | 4/2020 | Schouten et al. |
| 2020/0230499 | A1 | 7/2020 | Buser et al. |
| 2021/0004393 | A1 | 1/2021 | Miller |
| 2021/0174297 | A1* | 6/2021 | Toldo ................... G06Q 20/102 |
| 2021/0182602 | A1* | 6/2021 | V ........................ G06K 9/6298 |

OTHER PUBLICATIONS

Thanh et al., "Multi-Armed Bandits for Many-Task Evolutionary Optimization," 2021 IEEE Congress on Evolutionary Computation (CEC), 2021, pp. 1664-1671.
Wang et al., "Online IT Ticket Automation Recommendation Using Hierarchical Multi-Armed Bandit Algorithms," Proceedings of the 2018 SIAM International Conference on Data Mining, Society for Industrial and Applied Mathematics, 2018, pp. 657-665.
Official Action for U.S. Appl. No. 15/836,530, dated Apr. 11, 2022, 48 pages.
Official Action for U.S. Appl. No. 16/730,076, dated Jan. 25, 2022, 39 pages.
Notice of Allowance for U.S. Appl. No. 17/201,450, dated Mar. 25, 2022, 11 pages.
U.S. Appl. No. 15/836,342, filed Dec. 8, 2017, now issued as U.S. Pat. No. 10,860,585.
U.S. Appl. No. 16/203,767, filed Nov. 29, 2018, now issued as U.S. Pat. No. 10,929,128.
U.S. Appl. No. 15/905,538, filed Feb. 26, 2018, now issued as U.S. Pat. No. 10,977,239.
U.S. Appl. No. 15/876,529, filed Jan. 22, 2018, now issued as U.S. Pat. No. 10,977,243.
U.S. Appl. No. 15/836,530, filed Dec. 8, 2017, published as U.S. Pub. No. 2019/0179924.
U.S. Appl. No. 15/836,674, filed Dec. 8, 2017, published as U.S. Pub. No. 2019/0179945.
U.S. Appl. No. 16/030,412, filed Jan. 9, 2018, published as U.S. Pub. No. 2020/0012730.
U.S. Appl. No. 16/173,596, filed Oct. 29, 2018, published as U.S. Pub. No. 2020/0134060.
U.S. Appl. No. 16/459,028, filed Jul. 1, 2019, published as U.S. Pub. No. 2021/0004393.
U.S. Appl. No. 16/730,076, filed Jul. 1, 2019.
U.S. Appl. No. 17/201,450, filed Mar. 15, 2021.
Official Action for U.S. Appl. No. 15/836,674, dated Sep. 14, 2021, 19 pages.
Notice of Allowance for U.S. Appl. No. 16/173,596, dated Nov. 10, 2021, 9 pages.
Official Action for U.S. Appl. No. 16/459,028, dated Nov. 29, 2021, 19 pages.
Official Action for U.S. Appl. No. 15/836,530, dated Aug. 20, 2021, 39 pages.
Official Action for U.S. Appl. No. 16/459,028, dated May 24, 2021, 15 pages.
U.S. Appl. No. 16/730,076, filed Dec. 30, 2019, Solari.
U.S. Appl. No. 17/201,450, filed Mar. 15, 2021, Schouten et al.
"Data Frame," wiki.GIS.com, Date Unknown, Archived Webpage dated May 23, 2010, retrieved from https://web.archive.org/web/20100523091909/http://wiki.gis.com/wiki/index.php/Data_Frame, 4 pages.
"Frames table schema," ArcGIS, Date Unknown, Archived Webpage dated Jan. 8, 2017, retrieved from https://web.archive.org/web/20170108090522/https://desktop.arcgis.com/en/arcmap/latest/manage-data/raster-and-images/frames-table-schema.htm, 4 pages.
Douglas et al., "Vectorization, Part 1: The Rise of Parallelism," Quantifi Solutions, Jun. 15, 2017, retrieved from https://www.quantifisolutions.com/vectorization-part-1-the-rise-of-parallelism, 6 pages.
Douglas et al., "Vectorization, Part 2: Why and What?," Quantifi Solutions, Jun. 22, 2017, retrieved from https://www.quantifisolutions.com/vectorization-part-2-why-and-what, 7 pages.

(56) References Cited

OTHER PUBLICATIONS

Douglas et al., "Vectorization, Part 3: Applying Vectorization to CVA Aggregation," Quantifi Solutions, Jul. 10, 2017, retrieved from https://www.quantifisolutions.com/vectorization-part-3-applying-vectorization-to-cva-aggregation, 6 pages.
Martin, "A Vectorized Hash-Join," University of California at Berkeley, May 11, 1996, 17 pages.
Pennington et al., "GloVe: Global Vectors for Word Representation," Stanford University, Aug. 2014, retrieved from http://www-nlp.stanford.edu/projects/glove/, 3 pages.
Teotia, "Columnar Databases and Vectorization," infoQ, May 27, 2018, retrieved from https://www.infoq.com/articles/columnar-databases-and-vectorization/, 18 pages.
Zukowski et al., "MonetDB/X100—A DBMS In The CPUS Cache," IEEE Computer Society Technical Committee on Data Engineering, 2005, 6 pages.
Official Action for U.S. Appl. No. 15/836,342, dated Feb. 7, 2020, 10 pages.
Official Action for U.S. Appl. No. 15/836,342, dated May 18, 2020, 14 pages.
Notice of Allowance for U.S. Appl. No. 15/836,342, dated Oct. 1, 2020, 9 pages.
Official Action for U.S. Appl. No. 15/836,530, dated May 27, 2020, 32 pages.
Official Action for U.S. Appl. No. 15/836,530, dated Dec. 8, 2020, 42 pages.
Official Action for U.S. Appl. No. 15/836,674, dated Jun. 15, 2020, 23 pages.
Official Action for U.S. Appl. No. 15/836,674, dated Feb. 19, 2021, 20 pages.
Official Action for U.S. Appl. No. 15/876,529, dated Nov. 4, 2019, 19 pages.
Notice of Allowance for U.S. Appl. No. 15/876,529, dated Feb. 23, 2021, 10 pages.
Official Action for U.S. Appl. No. 15/905,538, dated May 26, 2020, 16 pages.
Official Action for U.S. Appl. No. 15/905,538, dated Oct. 5, 2020, 17 pages.
Notice of Allowance for U.S. Appl. No. 15/905,538, dated Feb. 24, 2021, 9 pages.
Official Action for U.S. Appl. No. 16/030,412, dated May 27, 2020, 13 pages.
Official Action for U.S. Appl. No. 16/030,412, dated Sep. 18, 2020, 18 pages.
Notice of Allowance for U.S. Appl. No. 16/030,412, dated Mar. 31, 2021, 8 pages.
Official Action for U.S. Appl. No. 16/173,596, dated Aug. 7, 2020, 9 pages.
Official Action for U.S. Appl. No. 16/173,596, dated Feb. 23, 2021, 10 pages.
Official Action for U.S. Appl. No. 16/203,767, dated Aug. 13, 2020, 9 pages.
Official Action for U.S. Appl. No. 16/203,767, dated Nov. 27, 2020, 13 pages.
Notice of Allowance for U.S. Appl. No. 16/203,767, dated Dec. 21, 2020, 7 pages.

* cited by examiner

METHODS AND SYSTEMS FOR CAPTURING DATA OF A DATABASE RECORD RELATED TO AN EVENT

FIELD OF THE DISCLOSURE

Embodiments of the present disclosure relate generally to methods and systems for managing transaction records in a database and more particularly to capturing data of a database record related to an event.

Figure 1:
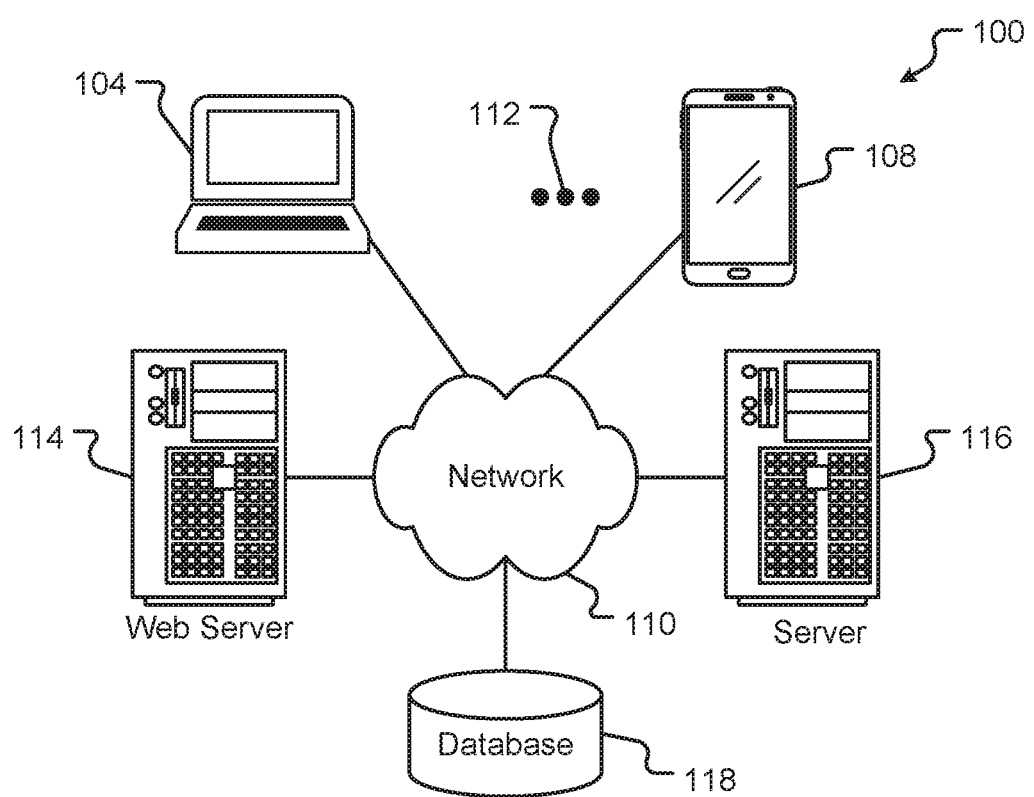
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-835032 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation SIP, TCP/IP, SNA, IPX, AppleTalk, and the like. Merely by way of example, the network 110 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C #®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
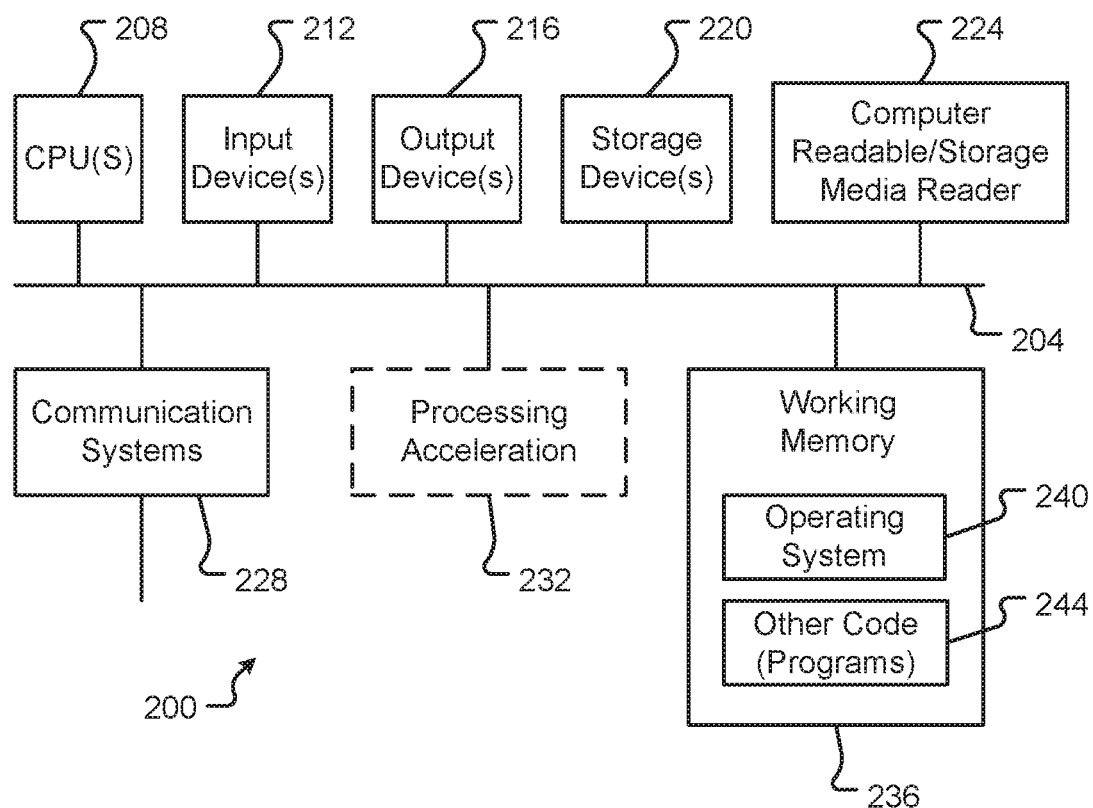
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random-access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-835032 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
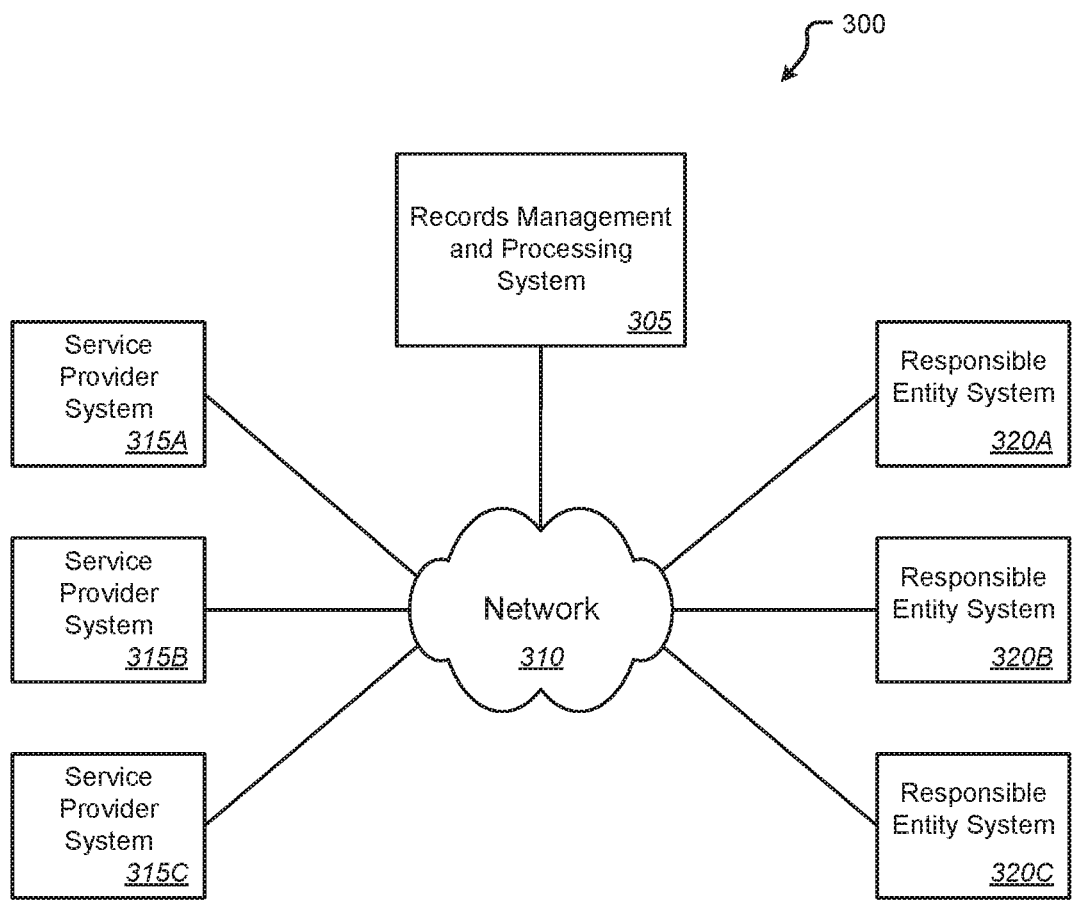
FIG. 3 is a block diagram illustrating an exemplary environment in which a records management and processing system can be implemented according to one embodiment of the present disclosure.

FIG. 3 is a block diagram illustrating an exemplary environment in which a records management and processing system can be implemented according to one embodiment of the present disclosure. As illustrated in this example, the environment 300 can include a number of different systems. Specifically, the environment 300 can include a records management and processing system 305 which can comprise a server or other computing device as described above. The records management and processing system 305 can be communicatively coupled with a communication network 310 such as the Internet or any other one or more wired or wireless, local or wide area networks. The environment 300 can also include a number of service provider systems 315A-315C each of which can comprise a server or other computing device as described above and which can also be communicatively coupled with the communication network 310. Furthermore, the environment 300 can include a number of responsible entity systems 320A-320C each of which can comprise a server or other computing device as described above and which can also be communicatively coupled with the communication network 310. It should be noted that while three service provider systems 315A-315C and three responsible entity systems 320A-320C are shown here for illustrative purposes, any number of such systems 315A-315C and 320A-320C can be present in various different implementations without departing from the scope of the present disclosure.

According to one implementation, the service provider systems 315A-315C can represent those servers or other computer systems typically associated with an entity providing a service consumer. In one embodiment, the providers of the services can comprise healthcare providers such as hospital, doctors, physical therapists, counsellors, out-patient and/or urgent care facilities, pharmacies, or other such providers while the consumer can comprise a patient. In such embodiments, the responsible party systems 320A-320C can comprise, for example, those servers or other computer systems typically associated with an entity responsible for some duties related to the delivery of and/or payment for those services. For example, responsible parties can include third-party payors including but not limited to insurance companies, Medicare, Medicaid, and/or other private, governmental, or mixed public/private entities. While described here with reference to healthcare providers and third-party payors such as insurance companies, it should be understood that various embodiments of the present disclosure are not limited to such implementations. Rather, embodiments of the present invention are believed to be equally adaptable to and useful in environments and systems which process a large volume of electronic records according to complex rules and regulations, business or financial arrangements, etc.

Regardless of the exact implementation of nature of the entities involved, the records management and processing system 305 can comprise an intermediary between a plurality of service providers systems 315A-315C and the plurality of responsible entity systems 320A-320C. As such and as will be described in greater detail below, the records management and processing system 305 can maintain a set of records related to services provided to a consumer by each or the service providers and for which at least one of the responsible entities is responsible in some way, e.g., granting approval, making a payment, providing some additional information, etc. In the normal course of processing such records and such transactions, the records management and processing system 305 may experience a delay in the handling of some records. For example, delays can be caused by data anomalies in records provided to the records management and processing system 305 by the service provider systems 315A-315C. In other cases, delays can be caused by a problem or potential problem with the handling of records or the performance of required actions by the responsible entity systems 320A-320C. In the example of the healthcare implementation described above, the records can represent, at least in part, payments to be made by the responsible entities to the service providers and thus, can represent accounts receivable for the service providers. As such, the timely completion of handling such records can directly impacts the cashflow of the service providers. Additionally, the longer processing of such records is delayed, the more likely the payments will become contested or otherwise become problematic. In other implementations, the timely processing of records by the records management and processing system 305 can be equally important for a variety of other reasons.

Accordingly, embodiments of the present disclosure are directed to methods and systems for the timely processing of records by the records management and processing system 305 exchanged between the service provider systems 315A-315C and the responsible entity systems 320A-320C. More specifically, the records management and processing system 305 can maintain a set of rules defining conditions for processing records and associated actions to affect that processing upon satisfaction of or failure to satisfy the conditions of that rule. The records management and processing system 305 can also maintain tags identifying data in a record, current status of processing of a record, or other information about the record. The records management and processing system 305 can apply the rules to the records and assign tags to the records based on the conditions defined in the applied rules. The records management and processing system 305 can then process the records according to workflows for processing the records based on the assigned tags and applied rules.

In the health care example introduced above and as known in the art, the records management and processing system 305 may be adapted to manage and maintain records related to hospital visits, i.e., records indicating services provided by a hospital associated with a service provider system 315A-315C and which are payable or reimbursable by a third party associated with a responsible entity system 320A-320C such as outpatient care, inpatient care, emergency room visits, etc. Hospital visits are typically reimbursed at an individual charge level. A single charge can be defined as the collection of: department code (facility specific); charge code (facility specific); revenue code (nationally defined); Healthcare Common Procedure Coding System (HCPCS) code (nationally defined); service date; quantity or number of orders; and amount ($). HCPCS codes are currently subdivided into two main levels. Level 1 consists of Common Procedure (CPT) Codes defined by the American Medical Association (AMA). Level 2 consists of 5-digit alphanumeric codes which begin with a leading A-V character. These codes are maintained by Center for Medicare Services (CMS) and are publicly available.

During a hospital visit, various procedures and/or actions may be performed on the patient. Certain procedures and/or actions can then have a charge associated with them so that the hospital may be reimbursed for the procedure action. It is the responsibility of each hospital to convert the patient visit into the appropriate charges for complete reimbursement. However, a missing charge may occur, such as when the hospital (coder) does not place a charge line item on the account for a procedure/action that was performed. In this case the hospital will not be reimbursed for the work performed. Therefore, it is important to have a charge capture process, i.e., a process of capturing charges that would otherwise be lost due to incomplete or inaccurate coding.

The purpose of a charge capture process is a two-fold goal. The first goal is to eliminate or minimize the number of missing charges on a hospital account. Often this results in increased reimbursement revenue. A second goal is to ensure coding compliance and best practices for the charge coding on an account. Eliminating errors and ensuring compliance currently requires a skilled auditor to perform a secondary audit to determine if a charge is missing or an account is compliant. However, hospitals could be charging hundreds or thousands of individual visits every day.

Secondary audits require additional resources and costs. An audit could be broken into two main types. In a single charge audit type the auditor checks the account quickly for a specific type of missing charge or compliance. Generally, this is the fastest type of audit. In a full account audit the auditor checks the entire account for accuracy and compliance. A full audit takes significantly longer to perform than a single charge audit. Charge error rates on visits may be low. Re-auditing all visits is therefore impractical. A tradeoff exists between the costs needed to perform secondary audits and the achievement of the hospital's goals.

Embodiments of the present disclosure are directed to an improved charge capture process. Generally speaking, the records management and processing system 305 can be adapted to first utilize Artificial Intelligence (AI) or Machine Learning (ML) algorithms to predict missing charges on account records. These pre-selected accounts or charges can then be sent to secondary audit, e.g., an automated audit or a manual audit by an experienced human for deeper analysis. In this way, the expertise of human auditors or expertly trained system is efficiently utilized on high-probability accounts and further focused to looking for individual charges.

Figure 4:
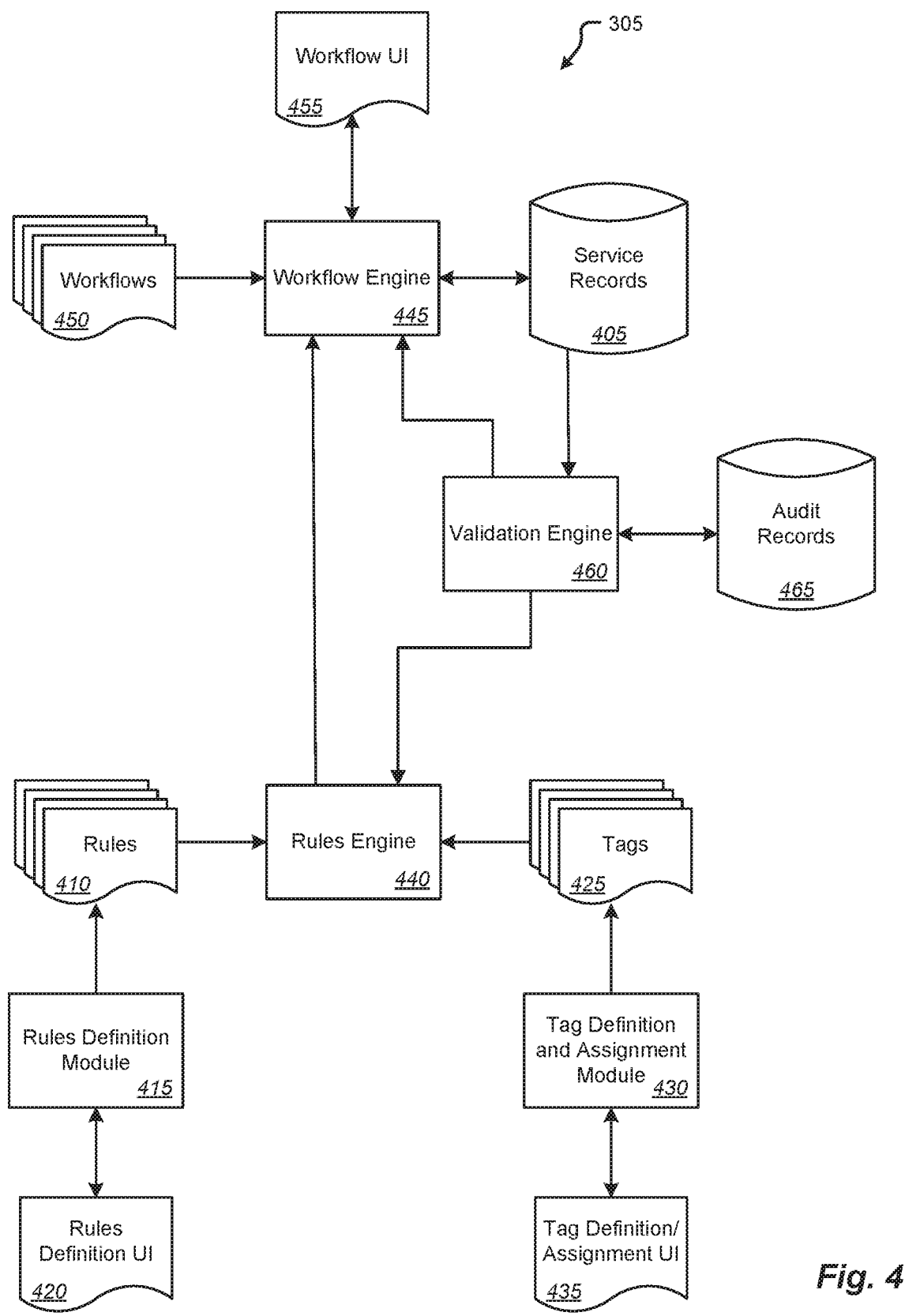
FIG. 4 is a block diagram illustrating elements of an exemplary records management and processing system according to one embodiment of the present disclosure.

FIG. 4 is a block diagram illustrating elements of an exemplary records management and processing system according to one embodiment of the present disclosure. As illustrated in this example, the records management and processing system 305 as described above can comprise a set of records maintained in a database 405 or other repository. As noted above, each record of the set of records in the database can comprise a record of a service provided to a consumer by a service provider and can identify at least one required action by at least one responsible entity of a plurality of responsible entities. Also, as described above, the records management and processing system 305 can comprise an intermediary between systems of the plurality of service providers and systems of the plurality of responsible entities.

The records management and processing system 305 can also maintain one or more rules 410 for managing and processing the records of the database 405. Generally speaking, a rule can comprise a definition of one or more conditions and an associated one or more actions to be performed upon satisfaction, or failure to satisfy, the conditions of that rule. Accordingly, each rule 410 maintained by the records management and processing system 305 can comprise one or more conditions for processing one or more records of the set of records 405 and at least one associated action to affect processing of the one or more records upon satisfaction of or failure to satisfy the one or more conditions of the rule 410. The conditions defined in some of these rules 410 can comprise conditions to be satisfied by one or more of the responsible entities 320A-320C described above. For example, one or more rules can define timing or other conditions a payment by a third-party payor, e.g., Medicare, Medicaid, an insurance company, etc., for a service rendered by the service provider, e.g., a hospital, doctor, pharmacy, etc., to the consumer/patient. Additionally, or alternatively, conditions defined in some of the rules 410 can define parameters for data in the record. For example, rules 410 can be defined for performing checks on the values of various fields of data in the records 405 such as comparing different fields, e.g., a value of total charges relative to a value of total adjustments, etc.

To facilitate definition of the rules 410, the records management and processing system 305 can further comprise a rules definition module 415. Generally speaking, the rules definition module 415 can comprise one or more applications executed by the records management and processing system 305 and which provide a rules definition interface 420. The rules definition interface 420 can include, for example, one or more webpages or other, similar interfaces providing elements through which an authorized user, such as an administrator or manager, can select or otherwise input conditions and corresponding actions for a new or modified rule. Once defined in this manner, the new or modified rule can be saved in the set of rules 410 and made available for application by the records management and processing system 305.

The records management and processing system 305 can also maintain a set of tags 425 for managing and processing the records 405. Generally speaking, these tags 425 can comprise a flag, metadata, or other information used to describe, explain, mark, or otherwise identify records in the set of records 405. For example, the tags 425 can include, but are not limited to, tags used to identify data in a record 405, a current status of processing of the record 405, or other information about the record. As will be described, these tags 425 can be used to identify records 405 that merit additional attention and/or processing and thus, the absence of tags associated with a record can implicitly indicate that additional attention or handling is not needed for that record.

To facilitate definition and use of the tags 425, the records management and processing system 305 can further comprise a tag definition and assignment module 430. Generally speaking, the tag definition and assignment module 430 can comprise one or more applications executed by the records management and processing system 305 and which provide a tag definition and assignment interface 435. The tag definition and assignment interface 435 can include, for example, one or more webpages or other, similar interfaces providing elements through which an authorized user, such as an administrator or manager, can select or otherwise input definitions of new or modified tags. Once defined in this manner, the new or modified tag can be saved in the set of tags 430 and made available for application by the records management and processing system 305.

The records management and processing system 305 can also comprise a rules engine 440. Generally speaking, the rules engine can comprise one or more applications executed by the records management and processing system 305 and which can read and apply the rules 410 to the records 405. That is, the rules engine 440 can compare the records stored in the database 405 to the conditions for the rules 410 and, upon finding records that satisfy, or fail to satisfy as the case may be and depending upon how the condition is defined, can perform or cause to be performed the action associated with the satisfied or failed condition. These actions can include, for example, applying one or more of the tags 425 to the identified records 405 or presenting the identified records to a user and receiving an indication of the tag(s) to be applied. The tag(s) 425 applied to a record can identify or mark that record for further attention to advance the processing of that record. Thus, records that are not tagged do not require additional attention or processing outside of normal processes since they are in a condition as defined in the rules as being normal or acceptable, e.g., within defined deadlines or other time limits etc. In other words, processing can be applied to one set of records based on the tags applied while processing of another set of records can be postponed or delayed so that the first set of records can be given more attention and resources.

The rules engine 440 can apply the rules 410 to the records 405 periodically, on demand, or upon the occurrence of predefined event or the satisfaction of one or more predefined conditions. For example, the rules engine 440 can apply the rules 410 as part of a routine process performed each day, week, month, or other period, and/or may be initiated or kicked off upon request by an authorized user of the system such as a manager or supervisor. As noted above, applying the rules 410 can include tagging one or more records based on the applied rules 410. Additionally, or alternatively, tags can be applied to one or more records based on a user selection or input. For example, a user viewing a set of records can select records from that set and apply one or more tags to those selected records based on conditions the user perceives and which may or may not be defined in the rules. Thus, tagging of records can be driven by the applied rules or based on input from a user and the tags applied in either way can influence the further handling of those tagged records.

According to one embodiment and as illustrated here, the records management and processing system 305 can also comprise a workflow engine 445 and a set of predefined workflows 450. Generally speaking, a workflow 450 can comprise a set of one or more steps to be performed on or related to a record. These steps can be wholly machine executable or may, in some cases, rely on some degree of human intervention. For example, these steps can range from presenting data from a tagged record in a user interface to a human operator, such as a collector, for an action to be performed by the operator, e.g., calling a payor or performing some other follow-up action, to a completely automated process such as sending an automatically generated communication to a payor system or combinations of various such human and machine actions. The workflow engine 445 can comprise one or more applications executed by the records management and processing system 305 and which, during execution, can read the predefined workflows 450 and implement or perform the steps defined therein. The workflows 450 can comprise a set of predefined, executable steps directed to advancing the processing of the records 405 identified by the rules 405 and tagged as described above. The workflow engine 445 can execute the workflows 450 by selecting a workflow 450 based on the tags 425 for a record 405 and executing the selected workflow 450 using the information from that record and, in some cases, based on further application of one or more rules 410 related to the tags 425 applied to that record 405. Thus, the conditions and associated actions defined in the rules 410 can also be applied by the workflow engine 445 as it executes the workflows 450. The workflow engine 445 can also provide a workflow user interface 450 for viewing and managing one or more workflows for processing records.

Therefore, the rules engine 440 can apply one or more of the rules 410 to the records saved in the database 405 to identify those records which should be further processed or given further scrutiny and mark those records with one or more tags 425. In this way, those records found to be within normal or acceptable conditions according to the applied rules need not be subjected to further scrutiny and/or processing thus saving resources such as human effort, processing overhead, etc. In other words, processing of one set of records can be performed in an expedited or priority manner while processing of another set of records can be deprioritized or postponed based on the tags applied to the records which is in turn based on the rules or input from a user.

One or more predefined workflow processes 450 can then be selected, e.g., based on the applied tags, initiated, and executed by the workflow engine 445 to further process those tagged records. The workflows 450 can be initiated automatically, e.g., triggered by the rules engine 445 upon completion of applying the tags 425, upon the occurrence of certain conditions, e.g., as defined in one or more rules 410, at a predetermined or pre-scheduled time, upon request, or in a variety of other ways without departing from the scope of the present disclosure. Processing the tagged records 405 by the workflow engine 445 can comprise performing the steps defined in the workflows 450, which can include applying the selected or additional rules 410 to the records being processed, in order to advance the handling of those records 405 by the records management and processing system 305, e.g., move an account towards payment or other resolution. Additional details of processing the records 405 by the workflow engine 445 based on the applied rules 410 and tags 425 according to various embodiments of the present disclosure will be described below.

As noted above, records 405 processed by the records processing and management system 605 can include, for example, records related to hospital visits, i.e., records indicating services provided by a hospital associated with a service provider system 315A-315C and which are payable or reimbursable by a third party associated with a responsible entity system 320A-320C. Hospital visits are typically reimbursed at an individual charge level. A single charge can be defined as the collection of: department code (facility specific); charge code (facility specific); revenue code (nationally defined); Healthcare Common Procedure Coding System (HCPCS) code (nationally defined); service date; quantity or number of orders; and amount ($). HCPCS codes are currently subdivided into two main levels. Level 1 consists of Common Procedure (CPT) Codes defined by the American Medical Association (AMA). Level 2 consists of 5-digit alphanumeric codes which begin with a leading A-V character. These codes are maintained by Center for Medicare Services (CMS) and are publicly available.

During a hospital visit, various procedures and/or actions may be performed on the patient. Certain procedures and/or actions can then have a charge associated with them so that the hospital may be reimbursed for the procedure action. It is the responsibility of each hospital to convert the patient visit into the appropriate charges for complete reimbursement. However, a missing charge may occur, such as when the hospital (coder) does not place a charge line item on the account for a procedure/action that was performed. In this case the hospital will not be reimbursed for the work performed. Therefore, it is important to have a charge capture process, i.e., a process of capturing charges that would otherwise be lost due to incomplete or inaccurate coding.

The purpose of a charge capture process is a two-fold goal. The first goal is to eliminate or minimize the number of missing charges on a hospital account. Often this results in increased reimbursement revenue. A second goal is to ensure coding compliance and best practices for the charge coding on an account. Eliminating errors and ensuring compliance currently requires a skilled auditor to perform a secondary audit to determine if a charge is missing or an account is compliant. However, hospitals could be charging hundreds or thousands of individual visits every day.

Secondary audits require additional resources and costs. An audit could be broken into two main types. In a single charge audit type the auditor checks the account quickly for a specific type of missing charge or compliance. Generally, this is the fastest type of audit. In a full account audit the auditor checks the entire account for accuracy and compliance. A full audit takes significantly longer to perform than a single charge audit. Charge error rates on visits may be low. Re-auditing all visits is therefore impractical. A tradeoff exists between the costs needed to perform secondary audits and the achievement of the hospital's goals.

According to one embodiment, the records management and processing system 305 can be adapted to perform a charge capture process. Accordingly, the records management and processing system 305 can include a validation engine 460 adapted to first utilize Artificial Intelligence (AI) or Machine Learning (ML) algorithms to predict missing charges on account records. These pre-selected accounts or charges can then be sent to secondary audit, e.g., an automated audit or a manual audit by an experienced human for deeper analysis according to a workflow 450 executed by the workflow engine 445. In this way, the expertise of human auditors or expertly trained system can be efficiently utilized on high-probability accounts and further focused to looking for individual charges.

As part of the charge capture process, the validation engine 460 can estimate a value of charge errors, i.e., a value of having complete and/or correct data in the record as opposed to having incomplete or missing data. In this way, the validation engine 460 can attempt to maximize the long-term return on investment for performing audits on missing charges. The ROI is the difference between the total returned $ and the cost to perform the audits. Therefore, the goal is to audit the 'highest expected value' charges first.

Missing data in the service records 405, i.e., missing charges, can have different monetary values. Different models used for identifying missing data, as will be described further below, can have differing accuracies or probabilities of being correct. For any missing data prediction a model produces the expected value of that prediction can be calculated as:

Average charge prediction expected value=Average charge value*probability of correct prediction for model The average charge value, or value of the missing data, can be estimated from the CDM or "computed CDM" for the prediction. The probability of a correct prediction for each model may not be definitively known initially. However, an initial guess of the likelihood of a correct prediction can be used. As will be described below, this probability or likelihood can be later adjusted using audit results.

Once the parameters are estimated, the predictions can be rank ordered by expected value and presented to the auditors in that order, e.g., through the workflow UI 455. The expected value can be considered to be the expected value of a correct charge or complete data for a record over time and many audits. For example, consider the following predictions:

Prediction A has charge value=$1000 and probability of a hit as 20%
Expected value=$1000*0.2=$200
Prediction B has a charge value of $100 and probability of a hit as 100%
Expected value=$100*1.0=$100

In this example, it might seem tempting to rank order prediction B first since it is likely to return a higher level of reimbursements. However, the higher expected value and thus the return on the audit investment will come from auditing many accounts with prediction A, even though four of five may be false positives.

As noted above, with each audit performed, auditor feedback can be incorporated to improve charge predictions by accurately estimating the true hit rate for any model used to predict missing data such as charges. After every audit the high-level categories can be determined for the success of the audit. These categories can include, for example: Agree—correct prediction; Reject—incorrect prediction; Invalid—prediction couldn't be audited due to various reasons (documentation not available, couldn't find record in host system etc.); or Unknown—do not feedback to predictions.

For a given model, e.g., "Model A," the probability of a correct prediction can be determined as follows:

Model $A$ hit probability=#Agree/Total audits=#Agree/(#Agree+#Reject)

When predictions are made the probability of a correct prediction can be computed for historical results and this model probability can be integrated into new predictions or selections.

Several different types of models can be used by the validation engine 460 of the records management and processing system 305 to predict missing data in the records 465. According to one embodiment, a model can be defined in or based on a set of rules 410 including, manually or human defined rules as well as association rules automatically generated based on machine learning from historical data, e.g., records 465 of past audits.

Generally speaking, rules can be applied as formal logic across sets of records. Manual rules can be those created by a human expert. For example, in the health care case described above, if the record includes an injection procedure code X or Y and the account does not have an injection administration code, then the account may be missing an administration code. Rules can generally be simple or complex as will be described in further detail below. Furthermore, the definition of the codes in the rule could be hard-coded or inferred or a mix. Hard coded rules can be defined in pre-specified sets of codes. Humans can generate the sets of codes manually, e.g., through the rules definition UI 420 or similar, and they can be hard coded as lookups. Inferred rules can be defined, for example by the rules definition module, by utilizing Natural Language Processing (NLP) to infer which codes should be included in each set based on descriptions (or other information) about each code. Mixed hard-coded and inferred rules apply combinations of both manually generated and machine generated rules.

For example, in the case a record indicates a vaccine was delivered via a HCPC procedure then a corresponding administration code should also be present in the record. An experienced human can write down the codes for each and then the rule can be applied. Alternately, NLP can be used to select the codes that conceptually match "vaccine delivery" and then similarly be used to select the codes that match "vaccine administration".

As mentioned above, rules can be simple or complex. A simple rule contains only two sets of codes. For example, if the record contains ANY code in the first set A, AND does not contain any code in the second set B then the record is flagged for missing one of the codes in set B. The definition of a simple rule can be hard-coded or inferred as described above.

Complex rules are those that apply more complex logic than simple rules, e.g., more than two sets of codes. For example, a complex code may be defined as: "has a code from set A, OR has a code from set B, and does not have a code from set C." Another example of a complex code may be: "has a code from set A, AND has a code from set B, and does not have a code from set C." The definition of a complex rule can be hard-coded or inferred as above.

Association rules can be created based on detecting strong patterns in historical data, e.g., records 465 of past audits. Association rules can have a form such as:

(code $A$,code $B$, . . . )=>code $C$

Which can be read as: the presence of code A AND code B imply the presence of code C "Antecedent"=>(code $A$,code $B$)

"Consequent"=>code $C$

For the purpose of detecting missing data and especially charge captures, the consequent can be a single code. In more general association rules, the consequent can be composed of many codes. The size of the association rule can be defined by the value k. If k=3 then there will be two antecedents and one consequent, if k=4 then three antecedents and one consequent, and so forth.

A major benefit to association rules is that the joint probability of many codes occurring simultaneously is considered. Rules can be selected that are arbitrarily strong (an 'infinitely strong' rule is one wherein no example in the data is contrary to the rule).

The formation of association rules is a complex topic. When dealing with thousands of codes and ALL possible combinations of those codes, combinatorial mathematics explodes the number of possibilities very fast. Sophisticated computational techniques are used to extract relevant rules for use.

Association rules can be trained on existing records and on a set of codes. Training of association rules can be broken into hierarchical categories. In the health care example, training of association rules can be broken into three main hierarchical categories: general which applies across all clients, e.g., service providers; client which applies across all facilities, e.g., hospitals, under a single client; and facility which applies at a single facility, e.g., hospital, care center, etc.

Client association rules can be those rules trained across all facilities under a single client, such as a service care provider. The primary codes defined in such association rules can be revenue code and CPT/HCPC codes. Client level rules serve many purposes. One type of flagging that can be done is identifying facility specific errors. The rules here will detect when facilities have systematic errors, i.e., missing codes, compared to other facilities.

Facility association rules can be those rules trained and applied at a single facility. The primary codes in facility level rules can be: revenue code; CPT/HCPC; department; and charge code. Facility rules can define department and charge codes specific to each facility. Facility rules can identify these patterns and detect missing charges at this level. Because facility level rules are trained at the facility level, systematic errors occurring at the facility may be missed but can be picked up by client level rules.

According to one embodiment, a hierarchical classification can be added to codes to augment the rules. That label can then be used in the discovery of association rules. For example, codes within the range 00100-01999 might be classified as anesthesia and codes in the range 00100-00222 might be classified as anesthesia: head. The classification of codes into labels can improve results as certain codes with similar meaning can be grouped together. As an example, in the case above, rules may be defined such as: anesthesia: head=>surgery.

According to one embodiment, and in the healthcare example described herein, the records management and processing system 305 can transform features using HCPCS codes to generate groups of similar procedures. These transformed HCPCS code groups can be extended to the single charge line definition, which are used for recognizing patterns between various groups instead of single charges. Stated another way, transformed input features can be used. The raw input features, i.e., individual HCPC/CPT codes billed and coded on a single account, can be transformed into custom groups. These groups can then be used as input features as well as target variables to make missed charge predictions in the form of range/grouped of HCPC/CPT codes. These HCPC/CPT groupings can then be used in model training and account scoring, for example.

Thus, models for predicting missing data in the records 405, or charge capture in the healthcare example, can be based on any number of rules of different types. According to another embodiment, a logistic regression model can be used for predicting missing data in the records 405. The approach of using logistic regression to predict missing data can involve building a logistic regression model on each code. So, if there are 20,000 codes there will be 20,000 logistic regression models. The regression models can then use each code present in the record to predict the probability of the presence of other codes not in the record.

Because regression models are linear, the probability between codes in the record is applied independently. Therefore, they suffer from problems that are common to limited probabilistic models. Namely, that the joint probability between codes cannot be accounted for. Code A or B give C cannot be predicted efficiently as both A and B will have high logistic regression scores.

In order to utilize logistic regression models, some form of suppression should be applied to determine when a code that is being predicted is unlikely to be there due to other codes on the account. One approach can be to build a set of other logistic regression models that are predicting when a code is not present, then combining the codes. However, again, the joint probability cannot be accounted for and combining two linear models will not fundamentally solve this problem.

Logistic regression models have a further issue in that an accurate training dataset needs to exist. Without audit records 465 over substantial time, this training dataset needs to be estimated. The estimation of this training data set by 'dropping out' codes in historical data is one way to proceed. However, the error statistics are effectively uniform and gaussian in this case. Real-world errors are rare and non-gaussian.

According to another embodiment, a K-Nearest Neighbor (KNN) model can additionally or alternatively be used to predict missing data. The KNN approach is very powerful if applied appropriately. However, significant challenges exist. In the KNN implementation, for a given record, the model selects K other records that are most like the given record. Then, existing data on the K other records are compared to the given record to look for missing data.

The initial primary challenge is to determine how similarity should be computed between records. It should be determined what form of similarity would select the K records that are best at estimating missing data. Some approaches might include selecting those records with the maximum number of overlapping codes, which is effectively the hamming distance. The hamming distance can also be normalized in various regards. There are many variations of similarity indexes which can be compared for performance. For example, other forms can include, but are not limited to, Euclidean distance, cosine similarity index, Minkowsky distance, correlation, chi-square in addition to hamming & choose the best one which fits. In the real-world, selecting the appropriate similarity cannot be done independently of the computational implementation.

Several non-trivial computational challenges exist to appropriately apply KNN. For example, there may be hundreds of thousands of records that need to be scored. Furthermore, for every record that needs to be scored, the similarity between the given record and hundreds of thousands of records should be computed. Therefore, advanced estimations, simplifications, or other approaches may be applied to efficiently perform similarity measures.

Stated another way, the records management and processing system 305 can maintain a plurality of records in a database 405. Each record of the plurality of records can comprise a record of a service provided to a consumer by a service provider of a plurality of service providers, wherein the records management and processing system 305 comprises an intermediary between systems 315A-315C of the plurality of service providers and systems 320A-320C of a plurality of responsible entities. Each record can also relate to some event, e.g., billing for the service provided. Capturing data of records in the database 405 can comprise predicting, by the validation engine 460 of the records management and processing system 305, possible missing data in one or more records of the plurality of records in the database 405.

The validation engine 460 can predict possible missing data in the one or more records by identifying the possible missing data based on available data in each record of the plurality of records and a model defining data expected in each record. The model can be defined by one or more manually defined rules and/or one or more association rules, for example, saved in the set of rules 410 and applied by the rules engine 440 and/or validation engine 460. Each association rule can be generated by machine learning processes performed on historical data, e.g., the set of audit records 465. In other cases, the model can comprise a logistics regression model or a K nearest neighbor model.

The validation engine 460 of the records management and processing system 305 can then select at least one record of the one or more records of the plurality of records predicted to have possible missing data. Selecting at least one record of the one or more records of the plurality of records predicted to have possible missing data can further comprise computing, by the validation engine 460, for each of the one or more records, an expected value for obtaining the possible missing data and ordering the one or more records based on the computed expected value for each of the one or more records and a probability of correct identification of missing data for the model defining the data expected in each record. The selected records are selected based on the ordering of the one or more records.

The validation engine 460 can then initiate, for each selected record, a workflow 450 for execution by the workflow engine 445 for further processing of each selected record. The further processing can be directed to collecting the missing data, such a manual or automated audit of the selected records. The validation engine 460 can, in some cases, also update the probability of correct identification of missing data for the model defining the data expected in each record based on results of executing the workflow 450 for each selected record, e.g., based audit records 465 for the executed audit.

Figure 5:
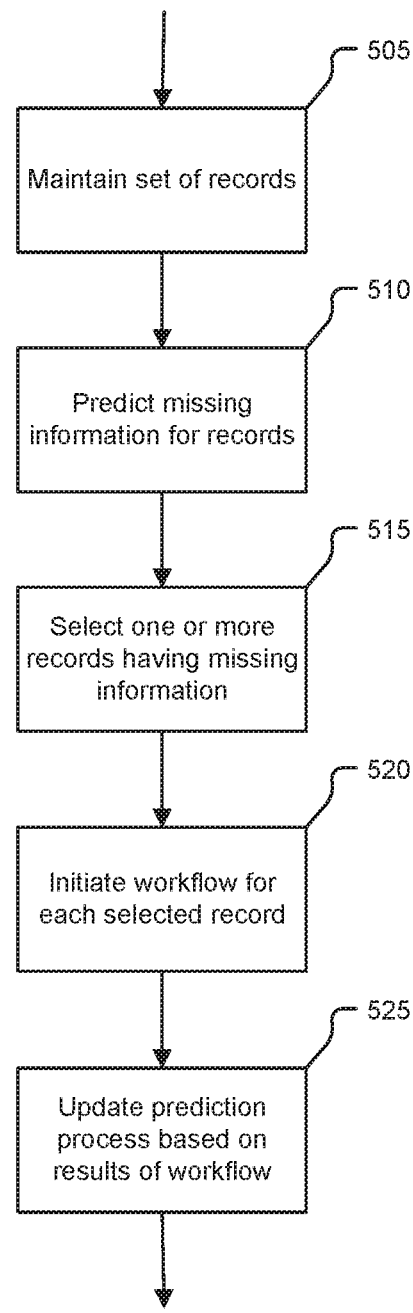
FIG. 5 is a flowchart illustrating an exemplary process for capturing data of a database record related to an event according to one embodiment of the present disclosure.

FIG. 5 is a flowchart illustrating an exemplary process for capturing data of a database record related to an event according to one embodiment of the present disclosure. As illustrated in this example, capturing data of a database record related to an event can comprise maintaining 505, by the records management and processing system 305, a plurality of records in a database 405. As described above, each record of the plurality of records can comprise a record of a service provided to a consumer by a service provider of a plurality of service providers. Also as described, the records management and processing system 305 can comprise an intermediary between systems of the plurality of service providers and systems of a plurality of responsible entities. The records management and processing system 305 can predict 510 possible missing data in one or more records of the plurality of records in the database and select 515 at least one record of the one or more records of the plurality of records predicted to have possible missing data. Additional details of exemplary processes for predicting 510 missing data in database records and selecting 515 records for additional processing will be described below with reference to FIG. 6. For each selected record, the records management and processing system 305 can initiate 520 a workflow 450 for further processing of each selected record. The further processing can be directed to collecting the missing data, e.g., manually or automatically auditing the record. The records management and processing system 305 can then update 525 the prediction process based on the results of executing the workflow. For example, updating 525 the prediction process can comprise updating a probability value indicating the likelihood of correct identification of missing data for a model defining the data expected in each record and which is used to predict missing data.

Figure 6:
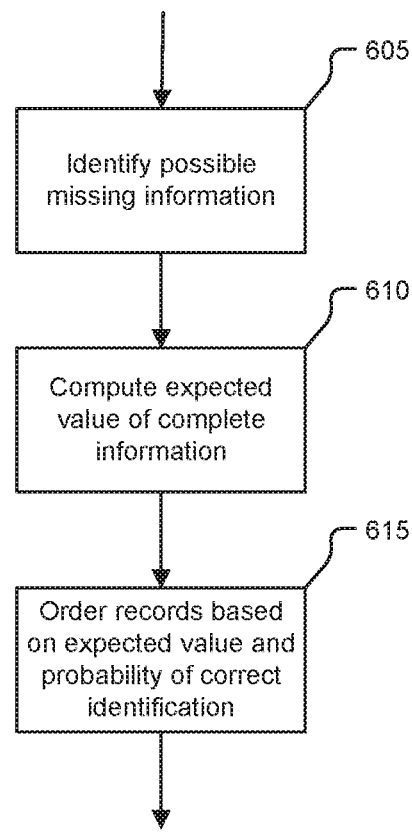
FIG. 6 is a flowchart illustrating additional details of exemplary processes for predicting missing data in database records and selecting records for additional processing according to one embodiment of the present disclosure.

FIG. 6 is a flowchart illustrating additional details of exemplary processes for predicting missing data in database records and selecting records for additional processing according to one embodiment of the present disclosure. As illustrated in this example, predicting possible missing data in the one or more records of the plurality of records can comprise identifying 605 the possible missing data based on available data in each record of the plurality of records and a model defining data expected in each record. As described in detail above, the model can be defined by one or more manually defined rules and/or one or more association rules. Each association rule can be generated by machine learning processes performed on historical data, e.g., audit results etc. In other cases, and as also described above, the model can comprise a logistics regression model or a K nearest neighbor model.

Also as illustrated here, selecting at least one record of the one or more records of the plurality of records predicted to have possible missing data can further comprise computing 610, for each of the one or more records, an expected value for obtaining the possible missing data and ordering the one or more records based on the computed expected value for each of the one or more records and a probability of correct identification of missing data for the model defining the data expected in each record. Records can then be selected 615 based on the ordering of the one or more records.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for capturing data of a database record related to an event, the method comprising:
   maintaining, by a records management and processing system, a plurality of records in a database, each record of the plurality of records comprising a record of a service provided to a consumer by a service provider of a plurality of service providers, wherein the records management and processing system comprises an intermediary between systems of the plurality of service providers and systems of a plurality of responsible entities;
   predicting, by the records management and processing system, possible missing data in one or more records of the plurality of records in the database, wherein predicting possible missing data in the one or more records of the plurality of records comprises identifying the possible missing data based on available data in each record of the plurality of records and a model defining data expected in each record;

selecting, by the records management and processing system, at least one record of the one or more records of the plurality of records predicted to have possible missing data, wherein selecting at least one record of the one or more records of the plurality of records predicted to have possible missing data further comprises computing for each of the one or more records, an expected value for obtaining the possible missing data and ordering the one or more records based on the computed expected value for each of the one or more records and a probability of correct identification of missing data for the model defining the data expected in each record, wherein the selected records are selected based on the ordering of the one or more records; and initiating, by the records management and processing system, for each selected record, a workflow for further processing of each selected record, the further processing directed to collecting the missing data.

2. The method of claim 1, further comprising updating, by the records management and processing system, the probability of correct identification of missing data for the model defining the data expected in each record based on results of executing the workflow for each selected record.

3. The method of claim 1, wherein the model is defined by one or more manually defined rules.

4. The method of claim 1, wherein the model is defined by one or more association rules, each association rule generated by machine learning processes performed on historical data.

5. The method of claim 1, wherein the model comprises a logistics regression model.

6. The method of claim 1, wherein the model comprises a K nearest neighbor model.

7. A system comprising:
a processor; and
a memory coupled with and readable by the processor and storing therein a set of instructions which, when executed by the processor, causes the processor to capture data of a database record related to an event by:
maintaining a plurality of records in a database, each record of the plurality of records comprising a record of a service provided to a consumer by a service provider of a plurality of service providers, wherein the system comprises an intermediary between systems of the plurality of service providers and systems of a plurality of responsible entities;
predicting possible missing data in one or more records of the plurality of records in the database, wherein predicting possible missing data in the one or more records of the plurality of records comprises identifying the possible missing data based on available data in each record of the plurality of records and a model defining data expected in each record;
selecting at least one record of the one or more records of the plurality of records predicted to have possible missing data, wherein selecting at least one record of the one or more records of the plurality of records predicted to have possible missing data further comprises computing for each of the one or more records, an expected value for obtaining the possible missing data and ordering the one or more records based on the computed expected value for each of the one or more records and a probability of correct identification of missing data for the model defining the data expected in each record, wherein the selected records are selected based on the ordering of the one or more records; and initiating, for each selected record, a workflow for further processing of each selected record, the further processing directed to collecting the missing data.

8. The system of claim 7, wherein the instructions further cause the processor to update the probability of correct identification of missing data for the model defining the data expected in each record based on results of executing the workflow for each selected record.

9. The system of claim 7, wherein the model is defined by one or more manually defined rules.

10. The system of claim 7, wherein the model is defined by one or more association rules, each association rule generated by machine learning processes performed on historical data.

11. The system of claim 7, wherein the model comprises a logistics regression model or a K nearest neighbor model.

12. A non-transitory, computer-readable medium comprising a set of instructions stored therein which, when executed by a processor, causes the processor to capture data of a database record related to an event by:
maintaining a plurality of records in a database, each record of the plurality of records comprising a record of a service provided to a consumer by a service provider of a plurality of service providers, wherein the system comprises an intermediary between systems of the plurality of service providers and systems of a plurality of responsible entities;
predicting possible missing data in one or more records of the plurality of records in the database, wherein predicting possible missing data in the one or more records of the plurality of records comprises identifying the possible missing data based on available data in each record of the plurality of records and a model defining data expected in each record;
selecting at least one record of the one or more records of the plurality of records predicted to have possible missing data, wherein selecting at least one record of the one or more records of the plurality of records predicted to have possible missing data further comprises computing for each of the one or more records, an expected value for obtaining the possible missing data and ordering the one or more records based on the computed expected value for each of the one or more records and a probability of correct identification of missing data for the model defining the data expected in each record, wherein the selected records are selected based on the ordering of the one or more records; and initiating, for each selected record, a workflow for further processing of each selected record, the further processing directed to collecting the missing data.

13. The non-transitory, computer-readable medium of claim 12, wherein the instructions further cause the processor to update the probability of correct identification of missing data for the model defining the data expected in each record based on results of executing the workflow for each selected record.

14. The non-transitory, computer-readable medium of claim 12, wherein the model comprises one of a model defined by one or more manually defined rules, a model defined by one or more association rules, each association rule generated by machine learning processes performed on historical data, a logistics regression model, or a K nearest neighbor model.

* * * * *